(12) United States Patent
Hough et al.

(10) Patent No.: US 10,563,525 B2
(45) Date of Patent: Feb. 18, 2020

(54) BLADE FEATURE TO SUPPORT SEGMENTED COVERPLATE

(71) Applicant: UNITED TECHNOLOGIES CORPORATION, Farmington, CT (US)

(72) Inventors: Matthew Andrew Hough, West Hartford, CT (US); Christopher Corcoran, Manchester, CT (US); Jeffrey S. Beattie, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 387 days.

(21) Appl. No.: 15/038,536

(22) PCT Filed: Nov. 5, 2014

(86) PCT No.: PCT/US2014/064041
§ 371 (c)(1),
(2) Date: May 23, 2016

(87) PCT Pub. No.: WO2015/112226
PCT Pub. Date: Jul. 30, 2015

(65) Prior Publication Data
US 2016/0290142 A1    Oct. 6, 2016

Related U.S. Application Data

(60) Provisional application No. 61/918,000, filed on Dec. 19, 2013.

(51) Int. Cl.
*F01D 5/30* (2006.01)
*F01D 25/00* (2006.01)

(52) U.S. Cl.
CPC .......... *F01D 5/3015* (2013.01); *F01D 25/005* (2013.01); *F05D 2220/32* (2013.01); *Y02T 50/671* (2013.01)

(58) Field of Classification Search
CPC ........ F01D 5/30; F01D 5/3007; F01D 5/3015; F01D 25/005; F01D 5/326; F01D 11/006; Y02T 50/671
See application file for complete search history.

(56) References Cited

U.S. PATENT DOCUMENTS

| 5,957,660 A | 9/1999 | Evans et al. |
| 6,234,756 B1 * | 5/2001 | Ress, Jr. ................... F01D 5/30 29/525.02 |

(Continued)

FOREIGN PATENT DOCUMENTS

DE     102004036389 A1 *  3/2006  ........... F01D 5/3015

OTHER PUBLICATIONS

Machine Translation of DE 102004036389 A1.*

(Continued)

*Primary Examiner* — Moshe Wilensky
*Assistant Examiner* — Elton K Wong
(74) *Attorney, Agent, or Firm* — Carlson, Gaskey & Olds, P.C.

(57) ABSTRACT

A gas turbine engine component comprises a blade having a leading edge and a trailing edge. The blade is mounted to a disc and configured for rotation about an axis. A platform supports the blade, and has a fore edge portion at the leading edge and an aft edge portion at the trailing edge. At least one of the fore edge portion and aft edge portion includes a mouth portion defined by an inner wing and an outer wing spaced radially outward of the inner wing. At least one coverplate is retained against the disc by the inner wing. A gas turbine engine is also disclosed.

29 Claims, 3 Drawing Sheets

(56) References Cited

U.S. PATENT DOCUMENTS

| | | | | |
|---|---|---|---|---|
| 6,331,097 B1* | 12/2001 | Jendrix | ................... | F01D 5/081 |
| | | | | 416/219 R |
| 7,503,748 B2 | 3/2009 | Ferra et al. | | |
| 2004/0191067 A1 | 9/2004 | Phipps et al. | | |
| 2010/0196164 A1* | 8/2010 | Liotta | ................... | F01D 5/3015 |
| | | | | 416/220 R |
| 2011/0014050 A1 | 1/2011 | Lake et al. | | |
| 2012/0082568 A1* | 4/2012 | Tibbott | ................... | F01D 5/081 |
| | | | | 416/97 R |
| 2013/0136618 A1* | 5/2013 | Stapleton | ................ | F01D 5/143 |
| | | | | 416/235 |
| 2014/0356177 A1* | 12/2014 | Snyder | .................. | F01D 5/3015 |
| | | | | 416/220 R |
| 2015/0010384 A1* | 1/2015 | Hafner | .................. | F01D 5/3015 |
| | | | | 415/66 |
| 2015/0369062 A1* | 12/2015 | Tanaka | .................. | F01D 11/003 |
| | | | | 415/208.1 |

OTHER PUBLICATIONS

International Preliminary Report on Patentability for International Application No. PCT/US2014/064041 dated Jun. 30, 2016.
International Search Report and Written Opinion for PCT Application No. PCT/US2014/064041, dated Aug. 19, 2015.

\* cited by examiner

BLADE FEATURE TO SUPPORT SEGMENTED COVERPLATE

CROSS-REFERENCE TO RELATED APPLICATION

This application claims priority to U.S. Provisional Patent Application No. 61/918,000, filed 19 Dec. 2013.

STATEMENT REGARDING FEDERALLY SPONSORED RESEARCH OR DEVELOPMENT

This invention was made with government support under Contract No. FA8650-09-D-2923 0021 awarded by the United States Air Force. The Government has certain rights in this invention.

BACKGROUND OF THE INVENTION

Gas turbine engines include one or more turbine stages. Each stage includes a plurality of blades mounted to a disc that is fixed for rotation with a turbine shaft. The blades include a root portion that is secured into a corresponding blade pocket formed in the disc. Coverplates are used to seal the area where the root portions of the blades are secured into the disc.

Full hoop coverplates are typically utilized to seal off a trailing edge area of the blade pockets and attachments to minimize leakage. With long blade necks, these full hoop coverplates need to be very large and come close to the gas path. Large thermal gradients in these larger full hoop coverplates make the plates very hard to design and manufacture.

SUMMARY OF THE INVENTION

In a featured embodiment, a gas turbine engine component comprises a blade having a leading edge and a trailing edge. The blade is mounted to a disc and configured for rotation about an axis. A platform supports the blade, and has a fore edge portion at the leading edge and an aft edge portion at the trailing edge. At least one of the fore edge portion and aft edge portion includes a mouth portion defined by an inner wing and an outer wing spaced radially outward of the inner wing. At least one coverplate is retained against the disc by the inner wing.

In another embodiment according to the previous embodiment, the inner wing includes a retention feature that receives an outer peripheral edge of the at least one coverplate.

In another embodiment according to any of the previous embodiments, the inner wing includes a radially inner surface and a radially outer surface. The retention feature comprises an angled surface portion formed in the radially inner surface.

In another embodiment according to any of the previous embodiments, the angled surface portion is non-parallel to the axis.

In another embodiment according to any of the previous embodiments, the inner wing includes a nub extending outwardly from the radially inner surface in a direction toward the axis. The nub forms a secondary retention feature to retain the at least one cover plate in place.

In another embodiment according to any of the previous embodiments, the angled surface portion is located between the disc and the nub.

In another embodiment according to any of the previous embodiments, the at least one coverplate comprises a segmented coverplate portion that is part of a set of segmented coverplate portions that together form a first cover plate portion.

In another embodiment according to any of the previous embodiments, the at least one coverplate further includes a second cover plate portion that is located radially inward of the first cover plate portion.

In another embodiment according to any of the previous embodiments, the second coverplate portion comprises a single-piece full hoop coverplate.

In another embodiment according to any of the previous embodiments, the segmented coverplate portion includes the outer peripheral edge that is retained by the retention feature of the inner wing. The segmented coverplate portion includes an inner peripheral edge that is trapped against the disc by an outer peripheral edge of the full hoop coverplate.

In another embodiment according to any of the previous embodiments, the full hoop coverplate is comprised of a nickel alloy material and the first cover plate portion is comprised of a titanium aluminium alloy material.

In another embodiment according to any of the previous embodiments, the at least one coverplate comprises a first coverplate portion and a second cover plate portion located radially inward of the first coverplate portion. The first coverplate portion is made from a first material. The second coverplate portion is made from a second material different than the first material.

In another embodiment according to any of the previous embodiments, the second material is a nickel alloy material and the first material is a titanium aluminium alloy material.

In another embodiment according to any of the previous embodiments, the first coverplate portion comprises a segmented coverplate and the second coverplate comprises a full hoop coverplate.

In another embodiment according to any of the previous embodiments, the mouth is formed at the aft edge portion of the platform.

In another featured embodiment, a gas turbine engine comprises a compressor section. A turbine section is downstream of the compressor section, and includes at least one stage comprised of a plurality of blades mounted to a disc and configured for rotation about an axis. Each blade has a leading edge and a trailing edge and is supported on a platform. The platform has a fore edge portion at the leading edge and an aft edge portion at the trailing edge. At least one of the fore edge portion and aft edge portion includes a mouth portion defined by an inner wing and an outer wing spaced radially outward of the inner wing. At least one coverplate is retained against the disc by the inner wing.

In another embodiment according to the previous embodiment, the inner wing includes a radially inner surface and a radially outer surface. The inner wing includes a retention feature formed in the radially inner surface that receives an outer peripheral edge of the at least one coverplate.

In another embodiment according to any of the previous embodiments, the retention feature includes a first feature comprising an angled surface portion and a second feature comprising a nub extending outwardly from the radially inner surface in a direction toward the axis. The angled surface portion is located between the nub and the disc.

In another embodiment according to any of the previous embodiments, the at least one coverplate comprises a first coverplate portion and a second cover plate portion located radially inward of the first coverplate portion. The first coverplate portion is made from a first material and the second coverplate portion is made from a second material different than the first material.

In another embodiment according to any of the previous embodiments, the first coverplate portion comprises a segmented coverplate and the second coverplate comprises a full hoop coverplate.

In another embodiment according to any of the previous embodiments,

These and other features may be best understood from the following drawings and specification.

DETAILED DESCRIPTION

Figure 1:
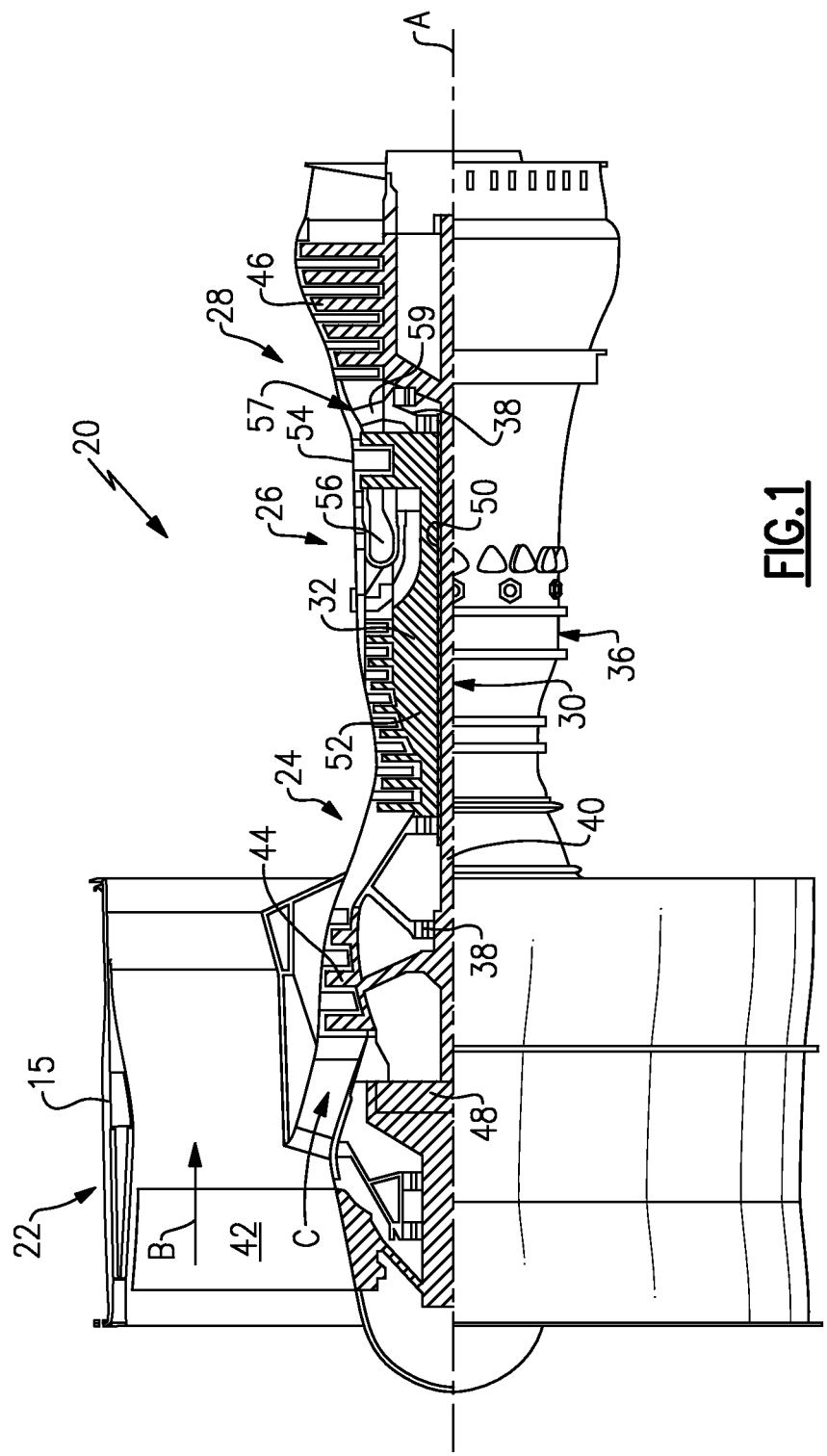
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
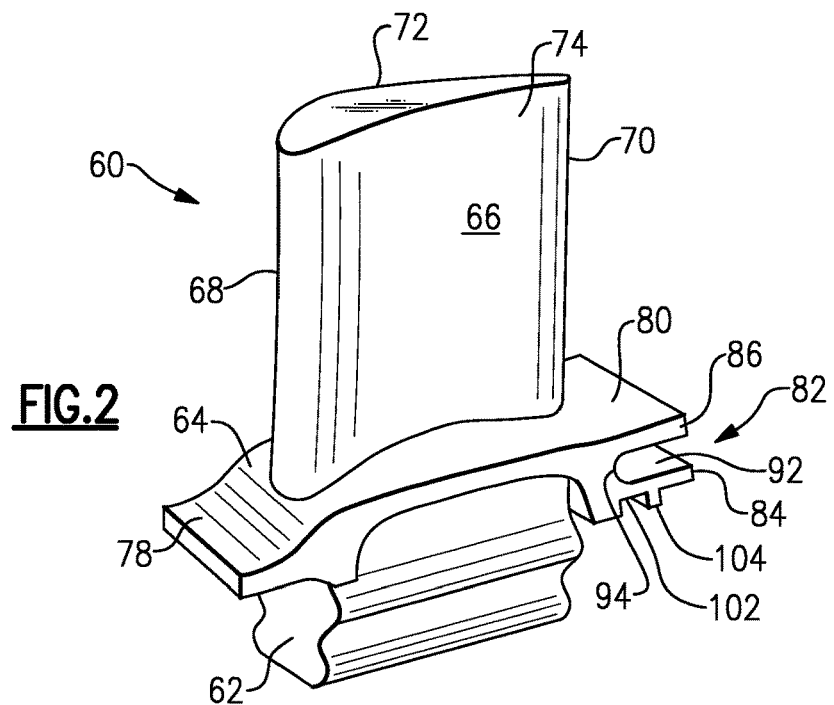
FIG. 2 is a side perspective view of a turbine blade.

The high pressure turbine 54 and low pressure turbine 46 include one or more stages of rotating blades 60 (FIG. 2). Each stage includes a plurality of blades 60 and each blade 60 has a root section 62, a platform 64, and an airfoil section 66. The airfoil section 66 includes a leading edge 68, a trailing edge 70, a suction side wall 72, and a pressure side wall 74. Root section 62 is connected to a disc 76 (FIG. 3) that is fixed for rotation with a corresponding one of the rotating shafts 40, 50.

The platform 64 has a fore edge portion 78 at the leading edge 68 and an aft edge portion 80 at the trailing edge 70. At least one of the fore edge portion 78 and aft edge portion 80 includes a mouth portion 82 that is defined by an inner wing 84 and an outer wing 86 spaced radially outward of the inner wing 84. In the example shown in FIGS. 2-4, the mouth portion 82 is formed within the aft edge portion 80.

At least one coverplate 88 (FIG. 3) is retained against the blade and the disc 76 by the inner wing 84. In one example, the least one coverplate 88 comprises a first coverplate portion 88a and a second cover plate portion 88b that is located radially inward of the first coverplate portion 88a. In this example, the first coverplate portion 88a comprises a segmented coverplate and the second coverplate portion 88b comprises a full hoop coverplate.

The full hoop coverplate is a single-piece, monolithic structure that extends three hundred and sixty degrees about the axis A. The full hoop coverplate covers a radially inner portion of an aft end 90 of the disc 76.

The segmented coverplate is comprised of a series or set of segmented coverplate portions that cover the radially outer portion of the aft end 90 of the disc 76. Each coverplate portion extends in a circumferential direction about the axis A to cover the aft end 90 portion for a sub-set of blades 60 of the plurality of blades 60 that extend completely around the disc 76. Thus, the segmented coverplate portions cooperate with each other to completely cover the radially outer portion of the aft end 90 of the disc 76. The coverplates also cooperate with each other to cover an aft pocket created between adjacent blades 60. The segmented plates are used to seal gaps in the slot that retains the blades 60 and the gaps that are formed between adjacent blades 60.

In one example, the first coverplate portion 88a is made from a first material and the second coverplate portion 88b is made from a second material that is different than the first material. The first material is comprised of a lighter weight material than the second material. The lighter weight material also has a higher temperature capacity than the second material. In one example, the second material is a nickel alloy material and the first material is a titanium aluminum alloy material. The nickel alloy material is a higher strength material making it more suitable for accommodating the full hoop loads. These materials are merely examples and other lightweight materials could be used for the first coverplate portion 88a and other stronger and heavier weight materials could be used for the second coverplate portion 88b.

Figure 3:
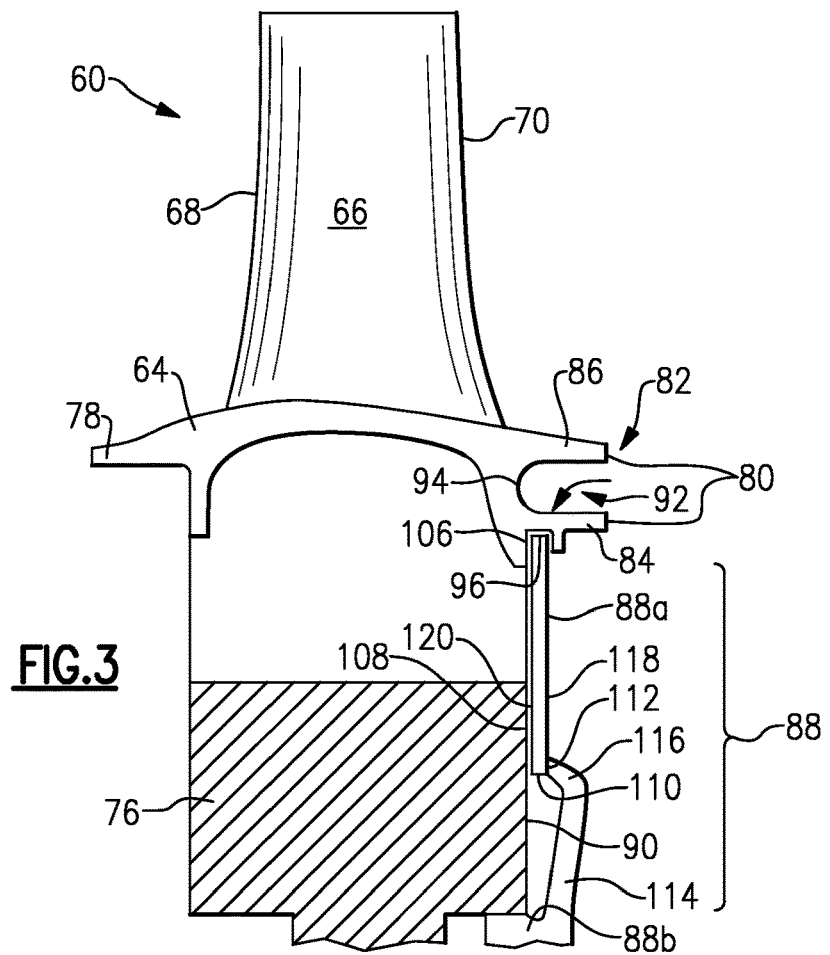
FIG. 3 is a side view of the blade of FIG. 2.
Figure 4:
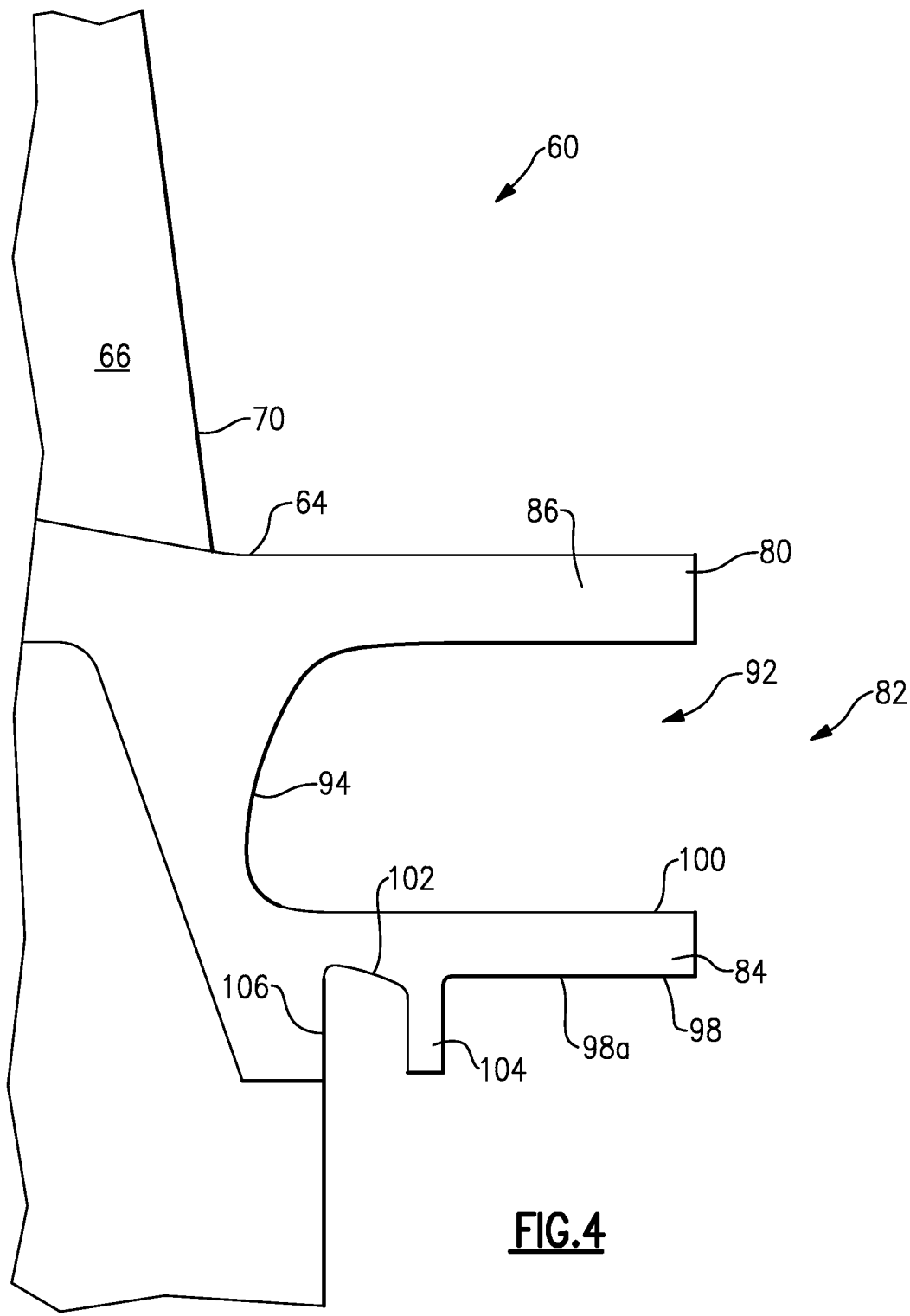
FIG. 4 is an enlarged view of a trailing edge portion of the airfoil section of the blade of FIG. 3.

In the example shown in FIGS. 3-4, the inner wing 84 and the outer wing 86 are radially spaced apart from each other to form an open area 92 between the inner 84 and outer 86 wings. The open area 92 is closed at a forward end 94 by the platform 64 and is open to the gas flow path at the aft edge portion 80 of the platform 64 to form a fishmouth shape.

The inner wing 84 includes a retention feature that receives an outer peripheral edge 96 of the first coverplate portion 88a. As shown in FIG. 4, the inner wing 84 includes a radially inner surface 98 and a radially outer surface 100. In one example, the retention feature is formed within the radially inner surface 98 and comprises an angled surface portion 102. The angled surface portion 102 supports the radial load of the coverplate 88a and pushes the coverplate 88a into a rear thrust face 106 of the blade 60 and disc lug 108 (FIG. 3) to create a tight seal.

The radially inner surface 98 extends in an aft direction and comprises a generally flat linear surface portion 98a. The angled surface portion 102 extends at an angle relative to the flat linear surface portion 98a that is greater than zero degrees. In other words, the angled surface portion 102 is non-parallel with the flat linear surface portion 98a. In one example, the flat linear surface portion 98a is generally parallel to the axis A and the angled surface portion is non-parallel to the axis A (FIG. 1).

The inner wing 84 also includes a nub 104 that extends outwardly from the radially inner surface 98 in a direction toward the axis A. The nub 104 forms a secondary retention feature to retain the at least one coverplate 88a in place during assembly and cold engine conditions. The angled surface portion 102 is located between the disc 76 and the nub 104. In one example, the angled surface portion 102 extends from the rear thrust face 106 of the blade 60 in a direction that is radially inward relative to the axis A to the nub 104.

The first coverplate portion 88a includes the outer peripheral edge 96, which is retained by the retention feature of the inner wing 84, and includes an inner peripheral edge 110 that is trapped against the disc 76 by an outer peripheral edge 112 of the second coverplate portion 88b. In one example, the second coverplate portion 88b includes a main body portion 114 that extends radially inward toward the axis A and the outer peripheral portion 116 extends transversely relative to the main body portion 114 in a direction toward the aft end 90 of the disc 76 and terminates at the outer peripheral edge 112. This results in the outer peripheral edge 112 engaging an aft face 118 of the first coverplate portion 88a to clamp or trap a forward face 120 of the first coverplate portion 88a directly against the aft end 90 of the disc 76.

The subject invention provides a mouth portion 82 in the platform 64 to shield and protect the lighter weight segmented coverplate, i.e. the first coverplate portion 88a, from gas path ingestion into the cavity between the trailing edge 70 of the blade 60 and the leading edge 68. The inner wing 84 shields the segmented coverplate and also includes the retention feature to support the radial load of the coverplate. The retention feature is formed on the underside of the inner wing 84 and comprises the angled surface portion 102 that supports the radial load. The angled surface portion 102 also pushes the coverplate into the rear thrust face of the blade and disc lug to create a tight seal. The nub 104 further facilities retention of the coverplate during assembly and engine off conditions.

By using the mouth portion 82 in combination with the segmented coverplate, the segmented plate is protected from gas path ingestion, which allows for lighter weight and lower temperature capacity materials to be used for the segmented coverplate. This provides a significant weight reduction compared to full hoop configurations.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine component comprising:
 a blade having a leading edge and a trailing edge, the blade mounted to a disc and configured for rotation about an axis;
 a platform supporting the blade, the platform having a fore edge portion at the leading edge and an aft edge portion at the trailing edge, and wherein at least one of the fore edge portion and aft edge portion includes a mouth portion defined by an inner wing and an outer wing spaced radially outward of the inner wing, and wherein the inner wing includes a radially outer surface and a radially inner surface that extends in an aft direction and comprises a flat linear surface portion that is parallel to the axis, and wherein the inner wing includes a nub extending from the radially inner surface and an angled surface portion formed in the radially inner surface at an angle relative to the flat linear surface portion, and wherein the angled surface portion extends radially inward from a rear thrust face of the blade to a forward side of the nub, and wherein the flat linear surface portion extends from an aft side of the nub to a distal end of the inner wing; and at least one coverplate retained against the disc by the inner wing, wherein an outer peripheral edge of the at least one coverplate is retained against the rear thrust face of the blade, and wherein a radial outer surface of the outer peripheral edge engages the angled surface portion of the inner wing.

2. The gas turbine engine component according to claim 1 wherein the nub extends from the radially inner surface of the inner wing in a direction toward the axis, the nub being spaced from the rear thrust face of the blade, and wherein the outer peripheral edge of the at least one coverplate is received within a pocket formed between the rear thrust face and the nub to retain the at least one coverplate against the disc.

3. The gas turbine engine component according to claim 2 wherein the radial outer surface of the outer peripheral edge engages the angled surface portion on the forward side of the nub.

4. The gas turbine engine component according to claim 3 wherein the angled surface portion is non-parallel to the axis and extends in a direction that is radially inward relative to the axis.

5. The gas turbine engine component according to claim 3 wherein the angle of the angled surface portion relative to the flat linear surface portion is greater than zero degrees.

6. The gas turbine engine component according to claim 2 wherein the at least one coverplate comprises a segmented coverplate portion that is part of a set of segmented coverplate portions that together form a first coverplate portion.

7. The gas turbine engine component according to claim 6, wherein the at least one coverplate further includes a second coverplate portion that is located radially inward of the first coverplate portion.

8. The gas turbine engine component according to claim 7 wherein the second coverplate portion comprises a single-piece full hoop coverplate.

9. The gas turbine engine component according to claim 8 wherein the segmented coverplate portion includes the outer peripheral edge that is retained by the nub of the inner wing, and wherein the segmented coverplate portion includes an inner peripheral edge that is trapped against the disc by an outer peripheral edge of the full single-piece hoop coverplate.

10. The gas turbine engine component according to claim 8 wherein the single-piece full hoop coverplate is comprised of a nickel alloy material and the first coverplate portion is comprised of a titanium aluminum alloy material.

11. The gas turbine engine component according to claim 1 wherein the mouth portion is formed at the aft edge portion of the platform.

12. The gas turbine engine component according to claim 1 wherein the inner and outer wings are parallel to each other.

13. The gas turbine engine component according to claim 1, wherein the at least one coverplate comprises a segmented coverplate portion and a full hoop coverplate portion, wherein the outer peripheral edge of the at least one coverplate comprises an outermost peripheral edge of the segmented coverplate portion, and wherein the segmented coverplate portion includes an innermost peripheral edge, and wherein the outermost peripheral edge engages the rear thrust face and the full hoop coverplate portion engages the innermost peripheral edge.

14. The gas turbine engine component according to claim 13, wherein the full hoop coverplate portion includes a main body portion that extends radially inward toward the axis and an outer peripheral portion that extends transversely relative to the main body portion in a direction toward an aft end of the disc to terminate at an outer peripheral surface, and wherein the outer peripheral surface engages an aft face of the segmented coverplate portion to trap a forward face of the segmented coverplate portion directly against the rear thrust face.

15. A gas turbine engine component comprising:

a blade having a leading edge and a trailing edge, the blade mounted to a disc and configured for rotation about an axis;

a platform supporting the blade, the platform having a fore edge portion at the leading edge and an aft edge portion at the trailing edge, and wherein at least one of the fore edge portion and aft edge portion includes a mouth portion defined by an inner wing and an outer wing spaced radially outward of the inner wing, and wherein the inner wing includes a radially outer surface and a radially inner surface that extends in an aft direction and comprises a flat linear surface portion that is parallel to the axis, and wherein the inner wing includes a nub extending from the radially inner surface and an angled surface portion formed in the radially inner surface at an angle relative to the flat linear surface portion, and wherein the angled surface portion extends radially inward from a rear thrust face of the blade to a forward side of the nub, and wherein the flat linear surface portion extends from an aft side of the nub to a distal end of the inner wing; and at least one coverplate retained against the disc by the inner wing, wherein a radial outer surface of an outer peripheral edge of the at least one coverplate engages the angled surface portion of the inner wing, and wherein the at least one coverplate comprises a first coverplate portion and a second coverplate portion located radially inward of the first coverplate portion, the first coverplate portion being made from a first material and the second coverplate portion being made from a second material different than the first material.

16. The gas turbine engine component according to claim 15 wherein the second material is a nickel alloy material and the first material is a titanium aluminum alloy material.

17. The gas turbine engine component according to claim 15 wherein the first coverplate portion comprises a segmented coverplate and the second coverplate portion comprises a full hoop coverplate.

18. The gas turbine engine component according to claim 15 wherein the nub extends from the radially inner surface of the inner wing in a direction toward the axis, the nub being spaced from the rear thrust face of the blade, and wherein the outer peripheral edge of the at least one coverplate is received within a pocket formed between the rear thrust face and the nub to retain the at least one coverplate against the disc, and wherein the angled surface portion is non-parallel to the axis and extends in a direction that is radially inward relative to the axis, and wherein the radial outer surface of the outer peripheral edge engages the angled surface portion on the forward side of the nub.

19. A gas turbine engine comprising:

a compressor section;

a turbine section downstream of the compressor section, the turbine section including at least one stage comprised of a plurality of blades mounted to a disc and configured for rotation about an axis, and wherein each blade has a leading edge and a trailing edge and is supported on a platform, the platform having a fore edge portion at the leading edge and an aft edge portion at the trailing edge, and wherein at least one of the fore edge portion and aft edge portion includes a mouth portion defined by an inner wing and an outer wing spaced radially outward of the inner wing, and wherein the inner wing includes a radially outer surface and a radially inner surface that extends in an aft direction and comprises a flat linear surface portion that is parallel to the axis and wherein the inner wing includes a nub extending from the radially inner surface and an angled surface portion formed in the radially inner surface at an angle relative to the flat linear surface portion, and wherein the angled surface portion extends radially inward from a rear thrust face of the blade to a forward side of the nub, and wherein the flat linear surface portion extends from an aft side of the nub to a distal end of the inner wing; and at least one coverplate retained against the disc by the inner wing, wherein an outer peripheral edge of the at least one coverplate is retained directly against the rear thrust face of the blade, and wherein a radial outer surface of the outer peripheral edge engages the angled surface portion of the inner wing.

20. The gas turbine engine according to claim 19 wherein the nub extends from the radially inner surface of the inner wing in a direction toward the axis, the nub being spaced from the rear thrust face of the blade, and wherein the outer peripheral edge of the at least one coverplate is received within a pocket formed directly between the rear thrust face and the nub, and wherein the radial outer surface of the outer peripheral edge engages the angled surface portion on the forward side of the nub.

21. The gas turbine engine according to claim 20 wherein the angled surface portion is non-parallel to the axis and extends in a direction that is radially inward relative to the axis.

22. The gas turbine engine according to claim 19 wherein the at least one coverplate comprises a first coverplate portion and a second coverplate portion located radially inward of the first coverplate portion, the first coverplate portion being made from a first material and the second coverplate portion being made from a second material different than the first material.

23. The gas turbine engine according to claim 22 wherein the first coverplate portion comprises a segmented coverplate and the second coverplate portion comprises a full hoop coverplate, and wherein the outer peripheral edge of the at least one coverplate comprises an outermost peripheral edge of the segmented coverplate portion, and wherein the segmented coverplate portion includes an innermost peripheral edge, and wherein the outermost peripheral edge engages the rear thrust face and the full hoop coverplate portion engages the innermost peripheral edge.

24. The gas turbine engine according to claim 23, wherein the full hoop coverplate portion includes a main body portion that extends radially inward toward the axis and an outer peripheral portion that extends transversely relative to the main body portion in a direction toward an aft end of the disc to terminate at an outer peripheral surface, and wherein the outer peripheral surface engages an aft face of the segmented coverplate portion to trap a forward face of the segmented coverplate portion directly against the rear thrust face.

25. The gas turbine engine according to claim 19 wherein the inner and outer wings are parallel to each other.

26. A gas turbine engine comprising:

a compressor section;

a turbine section downstream of the compressor section, the turbine section including at least one stage comprised of a plurality of blades mounted to a disc and configured for rotation about an axis, and wherein each blade has a leading edge and a trailing edge and is supported on a platform, the platform having a fore edge portion at the leading edge and an aft edge portion at the trailing edge, and wherein at least one of the fore edge portion and aft edge portion includes a mouth portion defined by an inner wing and an outer wing spaced radially outward of the inner wing, and wherein the inner wing includes a radially outer surface and a radially inner surface that extends in an aft direction and comprises a flat linear surface portion that is parallel to the axis, and wherein the inner wing includes a nub extending from the radially inner surface in a direction toward the axis, and wherein the inner wing includes an angled surface portion that extends from a rear thrust face of the blade, in a direction that is radially inward relative to the axis, to a forward side of the nub, and wherein the flat linear surface portion extends from an aft side of the nub to a distal end of the inner wing; and at least one coverplate retained against the disc by the inner wing.

27. The gas turbine engine according to claim 26 wherein an outer peripheral edge of the at least one coverplate is positioned between the rear thrust face and the nub such that the angled surface portion supports a radial load of the at least one coverplate and pushes the at least one coverplate into the rear thrust face of the blade and a disc lug of the disc to create a tight seal.

28. A gas turbine engine component comprising:

a blade having a leading edge and a trailing edge, the blade mounted to a disc and configured for rotation about an axis;

a platform supporting the blade, the platform having a fore edge portion at the leading edge and an aft edge portion at the trailing edge, and wherein at least one of the fore edge portion and aft edge portion includes a mouth portion defined by an inner wing and an outer wing spaced radially outward of the inner wing, and wherein the inner wing includes a radially outer surface and a radially inner surface that extends in an aft direction and comprises a flat linear surface portion that is parallel to the axis, wherein the inner wing includes a nub extending from the radially inner surface in a direction toward the axis, and wherein the inner wing includes an angled surface portion that extends from a rear thrust face of the blade, in a direction that is radially inward relative to the axis, to a forward side of the nub, and wherein the flat linear surface portion extends from an aft side of the nub to a distal end of the inner wing; and at least one coverplate retained against the disc by the inner wing.

29. The gas turbine engine component according to claim 28 wherein an outer peripheral edge of the at least one coverplate is positioned between the rear thrust face and the nub such that the angled surface portion supports a radial load of the at least one coverplate and pushes the at least one coverplate into the rear thrust face of the blade and a disc lug of the disc to create a tight seal.

* * * * *